June 10, 1930.　　　P. H. ROBINSON　　　1,762,353
DRINK MIXER
Filed Nov. 16, 1925
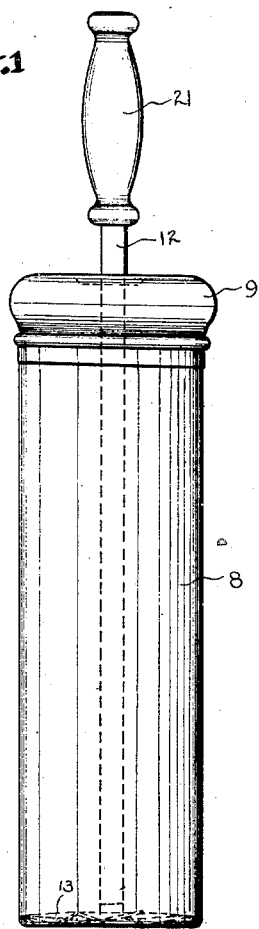
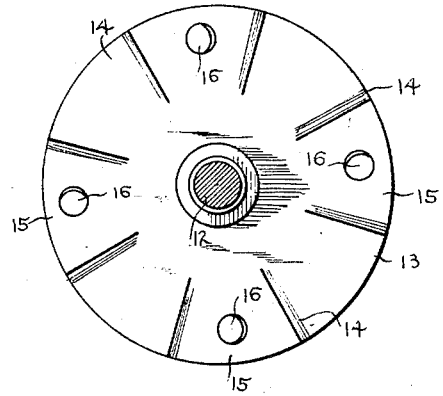
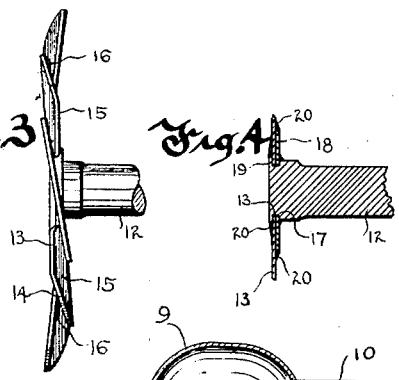
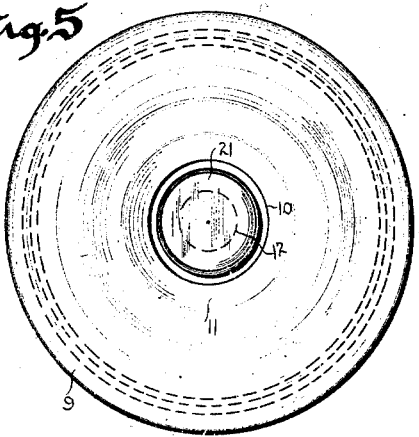
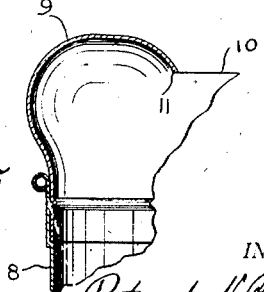
INVENTOR.
Patrick H. Robinson
BY
Morsell, Keeney & Morsell
ATTORNEYS.

Patented June 10, 1930

1,762,353

UNITED STATES PATENT OFFICE

PATRICK H. ROBINSON, OF RACINE, WISCONSIN, ASSIGNOR TO HAMILTON BEACH MFG. CO., OF RACINE, WISCONSIN, A CORPORATION OF WISCONSIN

DRINK MIXER

Application filed November 16, 1925. Serial No. 69,450.

The present invention relates generally to devices for mixing or agitating liquids and more particularly to those devices which are manually operable and are used at soda fountains or like places for mixing beverages.

One object of the invention is to provide a mixing device of this character, comprising a substantially cylindrical receptacle which has an open top and is adapted to be held in one hand, and a blade-bearing agitator which is adapted to be gripped and reciprocated up and down by the other hand and is operable as a non-rotatable piston in the receptacle.

Another object of the invention is to provide a liquid mixer of the aforementioned type in which the ends of the blades are extended to fit substantially against the side wall of the receptacle and cooperate therewith for the purpose of forming a guide for the lower end of the agitator.

Another object of the invention is the provision of a cover for the receptacle, which is shaped to deflect inwardly and downwardly any liquid which may be thrown upwardly against the under side thereof.

A further object of the invention is the provision of improved means for sealing and connecting the cover with respect to the receptacle.

A still further object of the invention is to provide a mixing device having a blade-bearing agitator which, if ice is placed therearound, operates as a strainer and to remove the ice automatically when the agitator proper is withdrawn from the receptacle.

An additional object of the invention is to provide a liquid mixing or agitating device which is generally of an improved character, consists of a comparatively small number of parts, and may be manufactured at a low cost.

Other objects of the invention and the various advantages and characteristics of the present construction will be apparent from a consideration of the following detailed description.

The invention consists in the several novel features hereinafter set forth and more particularly defined by the claims at the conclusion hereof.

In the drawing which accompanies and forms a part of this specification or disclosure and in which like numerals of reference denote corresponding parts throughout the several views:

Figure 1 is a side view of a mixing device embodying the invention;

Figure 2 is a top view on a larger scale of the blade-bearing member, the stem which is associated with said member and is operable to reciprocate the same up and down being shown in section;

Figure 3 is an edge view of the agitator-member and the lower end of the stem;

Figure 4 is a detail sectional view illustrating the type of connection between the agitator-member and stem;

Figure 5 is an enlarged plan; and

Figure 6 is a sectional view disclosing in detail the conformation and construction of the cover and the sealing and connecting means between the skirt part of the cover and the upper marginal portions of the receptacle.

The invention is exemplified in a device which is adapted primarily for use in manually mixing beverages. This mixer comprises a sheet metal receptacle 8 which has an open top and includes a substantially cylindrical side wall. The latter is adapted to be held in one hand during the mixing operation and operates in conjunction with the bottom of the receptacle to form an elongated liquid retaining chamber of uniform cross sectional area throughout substantially its entire length. The top of the receptacle is normally closed by a sheet metal cover 9 which consists of a top and a depending annular skirt. The top has formed in the central portion thereof a circular opening 10.

The mixer, in addition to the receptacle, comprises an agitator-element. This element consists essentially of a stem 12 and a member 13. The stem extends loosely through the cover opening 10. It is adapted to be shifted up and down to impart reciprocatory movement to the member 13, which movement results, as more fully described hereafter, in swirling the liquid for agitating or mixing purposes. The agitator-member 13 is formed from a sheet metal disc and has cut in the marginal portion thereof radial slits 14 which operate to form outwardly projecting substantially flat blades 15. These blades are bent to extend at a comparatively small angle relatively to the center portion of the member 13, with the result that the contiguous side edges thereof are positioned in close proximity to each other, as disclosed in Figure 3. The end edges of the blades substantially fit against the inner periphery of the side wall of the receptacle. As a result of this particular arrangement, that is angling and extending the blades as set forth, the lower end of the agitator-element is guided without the use of special or independent means for this purpose. Additionally, the member 13 works upon the entire column of liquid, and serves as a strainer so that if ice is placed thereabove the same is precluded from working its way beneath said member 13 and is automatically removed when the agitator-element is withdrawn from the receptacle 8. The member 13 is in effect a piston. When the latter is reciprocated up and down, the liquid is caused to swirl first in one direction and then in the opposite direction.

To increase the agitating function of the blade-bearing member 13 and to reduce opposition to reciprocation without affecting the straining ability of the agitator, a circular aperture 16 is punched in the central portion of every other blade 15. During the agitating action these apertures operate to jet a portion of the liquid at right angles to that portion which is swirled across the blades and consequently cause an efficient and thorough mixing of the contents of the receptacle.

The lower end of the stem 12 is provided with a shoulder 17 and a washer 18 is positioned against this shoulder. The agitator-member 13 has formed in the central portion thereof a circular opening 13' through which the extreme lower end of the stem extends. This end part of the stem is riveted or beaded over the central portion of the member 13, as at 19, to jam said member against the washer and form a rigid connection. To secure further the agitator-member in fixed relation with respect to the stem, solder is applied to the riveted portion of the stem, as at 20. By having the agitator-member 13 rigidly connected to the stem instead of rotatably mounted thereon, the liquid in the receptacle is positively caused to swirl during the reciprocatory or agitating movement. A handle 21 is fixedly secured to the upper end of the stem 12. This handle is adapted to be gripped by the user of the mixer and when moved up and down effects the desired non-rotating piston action of the member 13. The opening 10 is of sufficient diameter to permit the handle to pass readily therethrough.

The skirt of the cover has the upper portion thereof bent outwardly and then inwardly (see Figure 6) to form an auxiliary liquid compartment which is of slightly larger diameter than the chamber in the receptacle. This compartment serves to receive the liquid which is temporarily or momentarily trapped above the agitator-member 13 when the latter reaches the end of its up-stroke. The curved portion of the skirt, in addition to forming the auxiliary liquid compartment, tends to direct the liquid towards the center of the top. The portion of the top that surrounds the opening 10 is curved or arched downwardly so as to form a deflector 11 which operates to receive the liquid thrown inwardly by the curved portion of the skirt and to direct the same downwardly back into the receptacle. By causing the inner or opening-forming portion of the top to be arched, a tapered recess is formed in the top surface of the cover, which recess catches any of the liquid that adheres to and drops from the stem during reciprocation and directs the same back into the receptacle.

The top part of the side wall of the receptacle is spun outwardly to form an annular seat 22. The lower portion of the skirt of the cover fits within the mouth of the receptacle and abuts normally against this seat for sealing purposes. The skirt has an annular groove 23 formed therein. This groove causes the skirt-portion therebelow to be more or less contractible and consequently when the cover is forcibly pressed downwards this contractible portion telescopes into the part of the receptacle beneath the seat 22 to form a better seal. In such position of the cover, the grooved part fits about the seat 22 and operates as a stop.

The device is operated as follows: When a beverage is to be mixed, the various ingredients are first poured into the receptacle 8. The agitator-element is then inserted into place and the cover 9 connected by pressing the skirt thereof into the mouth of the receptacle and downwards against the annular seat 22. To effect the desired mixing of the liquids, the user of the mixer will grip the receptacle in one hand and the handle 21 in the other. Reciprocatory movement is then imparted to the agitator-element, which movement, as previously described, causes the blades 15 to swirl the liquid first in one direction and then the other. During this swirling movement of the liquid, the apertures 16 serve to jet a portion of the liquid transversely across that portion which swirls across the blades. When the reciprocation is done quickly the liquid is sometimes swirled with such force that it is thrown against the cover. In such instances, the curved portion of the skirt together with the deflector 11, operates to direct the displaced or thrown part of the liquid back into the vortex or the central portion of the receptacle. If the beverage is to be cooled during the agitating operation, ice is placed above the blade-bearing member 13. Since the blades are bent to extend at a comparatively small angle and the apertures 16 are not large in diameter, the ice is retained above the member 13 and is removed as a body when the agitator-element is disconnected from the receptacle.

The mixer herein disclosed consists of but a comparatively small number of parts and consequently may be manufactured at a low and reasonable cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a mixing device of the character described, the combination of a receptacle having an open top and comprising a side wall adapted to be held in one hand and shaped to form an elongated liquid retaining chamber of uniform cross sectional area throughout substantially its entire length, a cover removably connected to the top portion of the receptacle and having an opening formed in the central portion thereof, and an agitator-element consisting of a stem extending loosely through the cover-opening and into the chamber, a handle fixedly secured to the upper end of the stem and adapted to be gripped by the other hand and moved up and down to impart reciprocatory movement to the agitator-element, and a member fixedly secured to the lower end of the stem and provided with blades for swirling the liquid during the aforesaid reciprocatory movement, said blades bearing against the side wall of the receptacle to cause the lower end of the agitator-element to be guided in substantially a rectilinear path.

2. In a mixing device of the character described, the combination of a receptacle having an open top and comprising a side wall adapted to be held in one hand and shaped to form an elongated liquid retaining chamber of circular cross section, a stem extending into the chamber, a handle at the upper end of said stem adapted to be gripped by the other hand and moved up and down to impart reciprocatory movement to the stem, an agitator-member connected to the lower end of the stem and embodying blades for swirling the liquid during operation of the stem, and a sheet metal cover removably connected to the top part of the receptacle and having formed in the central portion thereof an opening through which the stem extends, the portion of the cover surrounding said opening being curved or arched downwardly to form a deflector whereby any liquid that is thrown into contact with the inner face of the cover during the up-stroke of the stem and agitator-member is directed downwardly into the central portion of the chamber.

3. In a mixing device of the character described, the combination of a receptacle having an open top and comprising a side wall adapted to be held in one hand and shaped to form an elongated liquid retaining chamber of circular cross section, a stem extending into the chamber, a handle at the upper end of said stem adapted to be gripped by the other hand and moved up and down to impart reciprocatory movement to the stem, an agitator-member connected to the lower end of the stem and embodying blades for swirling the liquid during operation of the stem, and a sheet metal cover removably connected to the upper part of the receptacle and comprising a top and an annular depending skirt, the top having formed in the central portion thereof an opening through which the stem extends, the upper portion of the skirt being curved outwardly and then inwardly to its juncture with the top so as to form a compartment of greater diameter than that of the chamber for receiving any liquid that may be thrown upwardly during the up-stroke of the stem and agitator-member.

4. In a mixing device of the character described, the combination of a receptacle having an open top and comprising a side wall adapted to be held in one hand and shaped to form an elongated liquid receiving chamber of circular cross section, a stem extending into the chamber, a handle at the upper end of said stem adapted to be gripped by the other hand and moved up and down to impart reciprocatory movement to the stem, an agitator-member connected to the lower end of the stem and embodying blades for swirling the liquid during operation of the stem, and a sheet metal cover removably connected to the top part of the receptacle and comprising a top and an annular depending skirt, the upper portion of the skirt being curved inwardly to its juncture with the top so as to deflect inwardly any liquid that is thrown upwardly during the up-stroke of the stem and agitator-member, the central portion of the top having an opening formed therein for the stem and being curved or arched downwardly to form a depending deflector for receiving the upwardly thrown liquid from the curved portion of the skirt and directing the same downwardly into the central part of the chamber.

5. In a mixing device of the character described, the combination of a sheet metal receptacle having an open top and comprising a substantially cylindrical side wall adapted to be held in one hand and operative to form an elongated liquid receiving chamber, the top part of said side wall being expanded to form an annular seat, a stem extending into the chamber, a handle at the upper end of said stem adapted to be gripped by the other hand and moved up and down to impart reciprocatory movement to the stem, an agitator-member connected to the lower end of the stem and embodying blades for swirling the liquid during operation of the stem, and a sheet metal cover for the receptacle comprising a top and an annular depending skirt, the top having an opening formed in the central portion thereof through which the stem extends, the skirt having an annular groove formed therein and being extended to fit within the mouth of the receptacle and abut against the annular seat.

In testimony whereof, I affix my signature.

PATRICK H. ROBINSON.